Feb. 25, 1964     E. A. J. MROZ     3,122,487
EVAPORATING APPARATUS AND PROCESS
Filed April 17, 1959     6 Sheets-Sheet 1

INVENTOR.
Edmund A. J. Mroz
BY John E. Herlihy
Attorney

INVENTOR.
Edmund A. J. Mroz
BY John E. Herlihy
Attorney

Feb. 25, 1964 E. A. J. MROZ 3,122,487
EVAPORATING APPARATUS AND PROCESS
Filed April 17, 1959 6 Sheets-Sheet 3

INVENTOR.
Edmund A. J. Mroz
BY John L. Herlihy
Attorney

Feb. 25, 1964 E. A. J. MROZ 3,122,487
EVAPORATING APPARATUS AND PROCESS
Filed April 17, 1959 6 Sheets-Sheet 4
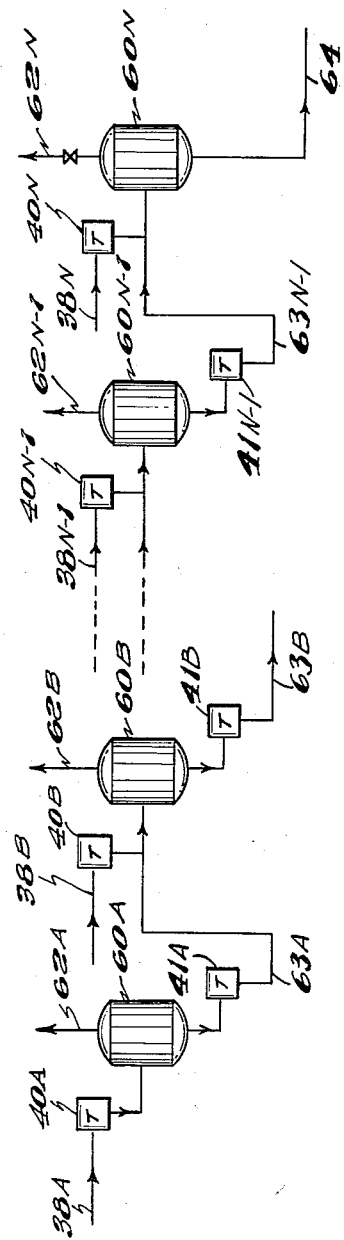
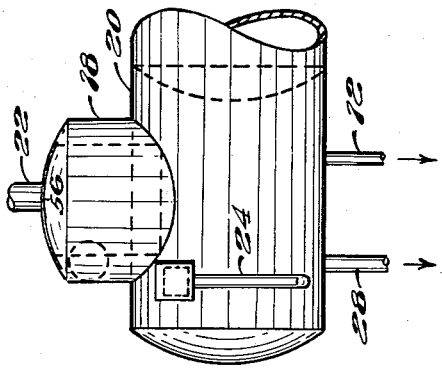
INVENTOR.
Edmund A. J. Mroz
BY John E. Hershey
Attorney

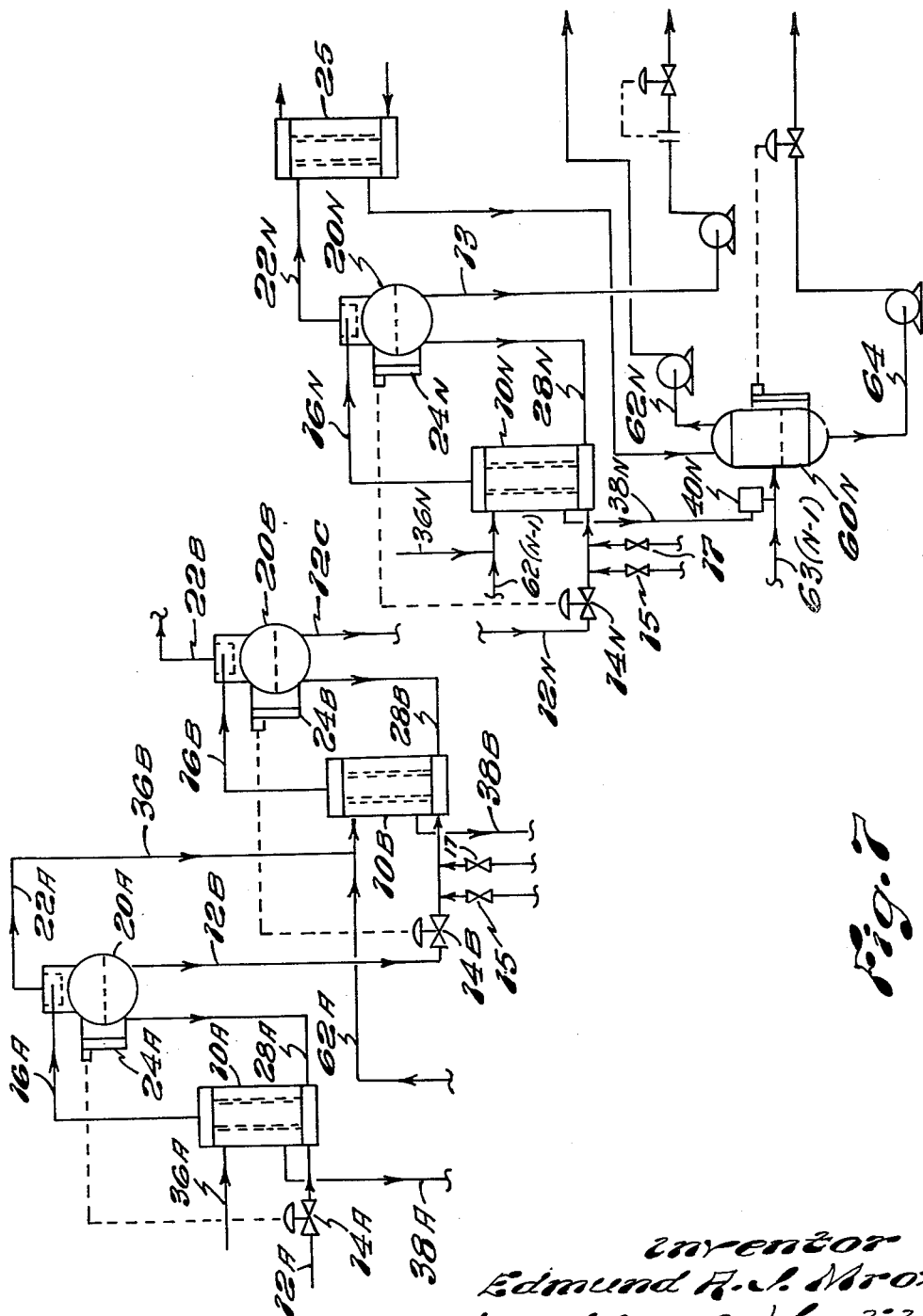

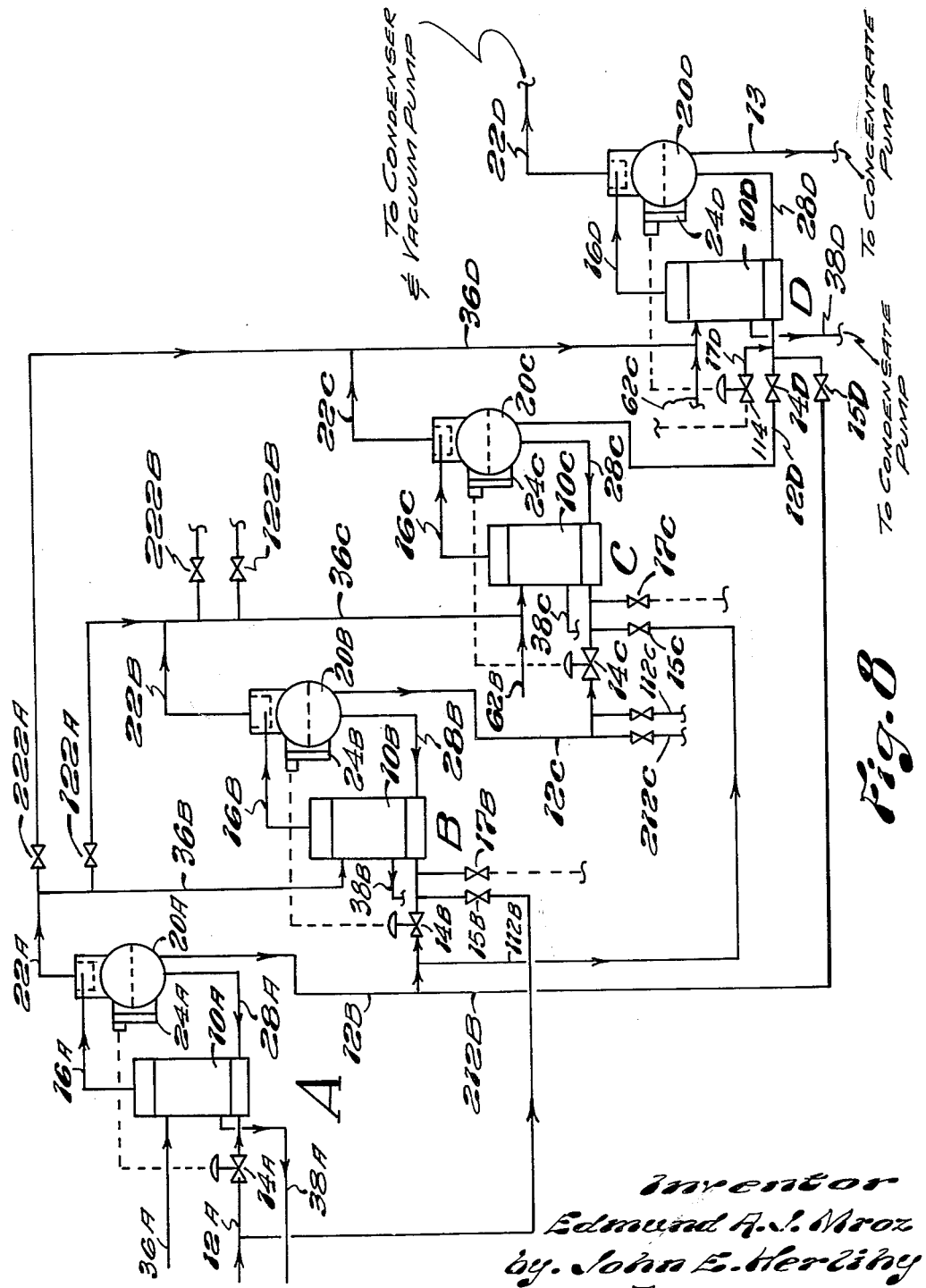

United States Patent Office 3,122,487
Patented Feb. 25, 1964

3,122,487
EVAPORATING APPARATUS AND PROCESS
Edmund A. J. Mroz, Stoneham, Mass.
(17 Harrison St., Melrose 76, Mass.)
Filed Apr. 17, 1959, Ser. No. 807,236
15 Claims. (Cl. 202—45)

This invention relates to process and apparatus for heat treating liquids. More particularly, this invention relates to vaporizing or evaporating liquids and to the general subject matter of concentration of liquid solutions or liquids containing suspended matter, and to distillation of liquids such as water. The invention is considered to be of particular value in the purification of brackish water and it is in this connection that it will be more particularly described.

In many areas of the world, the water which is available for drinking is contaminated in some degree with saline materials which make it distasteful. Also, these saline materials affect the value of the water industrially. Sometimes the salt content of the water in a given area is such that an industry cannot locate in that area, although other industrial considerations favor the location of such an industry in that area. Various ion exchange systems, filtration systems, adsorption and absorption systems, precipitation systems and distillation systems have been developed to remedy the water problem, and some measure of lessening of the problem has been realized.

Distillation, while in general the most effective way of eliminating brackishness, has heretofore been too expensive to use for major water purification installation. This has been primarily due to the inefficient utilization of the heat required to vaporize the water. In those situations where multiple effect evaporation and condensation have been used, genuine savings of total heat required for evaporation have been realized. However, the conventional multiple effect evaporators, as heretofore known, have been characterized by high initial or capital costs due in great part to the large masses of metal required for their construction and by significant operating costs occasioned by need for supervision, maintenance and, particularly, the relatively frequent descaling of heat transfer surfaces required to maintain effective performance.

Because of what I hereinafter refer to as the modular type of design which is a characteristic of the evaporator of my invention, I am able among other advantages to exploit the force of gravity to greater advantage than do the evaporators of conventional design and I can thereby eliminate substantially all of the mechanical or electrically driven pumps which are normally associated with evaporator operation. This provides for economies in initial cost and economies in operation.

It should be noted that in this description, the expressions, "preceding" and "succeeding," "first" and "last," "antecedent," and "subsequent" are used here to indicate the relative positions of the different stages or components thereof with respect to the direction of flow of the heating medium from stage to stage.

It is, therefore, an object of this invention, to provide an improved process for vaporizing or evaporating liquids.

It is a further object of this invention to provide a novel multi-stage evaporation process.

Another object of this invention is to provide a process for vaporizing or evaporating liquids which provides for efficient utilization of the heat provided for vaporization.

A further object of the invention is to provide a novel apparatus for conducting evaporation of liquids.

A further object of this invention is to provide apparatus for conducting evaporation of liquids with highly efficient utilization of the heat required for such evaporation.

Another object is to provide an evaporation apparatus, having its liquid inventory supply separate from the heat exchange elements so as to provide for the utilization of a treating medium at pressures and temperatures higher than customarily employed, by more fully utilizing, for high economy, the strengths of the materials of construction of such components through more compact design and fabrication.

These and other objects and advantages of this invention will be apparent to one skilled in the art, from the following description of my invention and from the claims.

I accomplish these objects by providing multiple modular evaporation effects, which are aligned in a series. Each of these effects comprises a circuit consisting of a chamber in which the heat is transferred indirectly from the heating medium to the liquid to be evaporated through the walls of the heating unit, an externally disposed separator for the liquid and vapors issuing from the heating chamber, and a reservoir for the liquid portion issuing from the heat exchange chamber which is also disposed externally of the heat exchanger.

In a preferred embodiment of my invention all of the liquid to be evaporated is introduced, preferably preheated, into the system through the first heat exchange chamber of the system, and similarly, all of the heating medium is also introduced into the system through the heating elements of the first heat exchange chamber of the system. The effluent issuing from the first heat exchange chamber includes liquid and vapor; and these products discharge into the separator and thence the liquid fractions pass into the reservoir, while the vapor fractions pass into the heating element of the next heat exchange chamber, where they function as the heating medium for that unit. The feed to the second heat exchange chamber of the series is provided from the reservoir of the first effect of the series. In the heat exchange chamber of the second effect of the series a portion of the liquid is vaporized and the effluent issuing from this chamber discharges into a separator for the liquids and vapors, whence the liquid portion passes into the reservoir chamber of the second effect and the vapor portion passes into the next or third heat exchange chamber in the series, wherein it acts as the heating medium for the third heat exchange chamber. The feed and the heating medium for each of the subsequent heat exchange chambers in the series is provided from the antecedent effect, the liquid portion being provided as feed for the chamber and the vapor being provided as the source of heat for the heating elements.

A liquid level control is associated with each reservoir, preferably being affixed thereto, measuring and controlling the amount of liquid therein. When the liquid level of a reservoir in a given effect tends to deviate from the desired datum, the control influences the valve by a signal or otherwise and thereby regulates the inflow of feed from the reservoir of the preceding effect into the heating chamber of that given effect. When enough liquid is furnished to the effect calling for it, the control on the reservoir causes a throttling of the feed inlet valve. Thus, when the liquid level in the reservoir of any of the effects is below the desired amount, liquid feed is furnished from the reservoir of the next preceding effect and when the level of the reservoir for the first effect is too low, the valve feeding the raw material to the evaporator is opened. Thus, the feed is controlled by the liquid level of the reservoir. It will thus be appreciated by those skilled in the art that the level maintained in the reservoir serves to establish and maintain a thermosiphon recycled pumping action within its circuit; also, it provides an inventory of feed liquor for succeeding effects and it regulates admission of feed liquor to its circuit.

The heating medium for the first effect may be steam at high pressure, and when water is the liquid which is being evaporated from the liquid feed, or when the heating medium is the vaporized form of the liquid which is being evaporated, the vapors flashed from the condensate leaving the first heat exchange unit can be admixed with the vapors issuing from the separator of the first or any subsequent effect of the series and thereby furnish a portion of the heating medium to a more subsequent effect in the system. Thus, at least a portion of the heating medium of the subsequent effects comprises the heat depleted heating medium of antecedent effects. In accordance with my preferred practice, vacuum may be applied to the subsequent effects of the system, and at the lower absolute pressures prevailing in those effects part of the liquid condensate fractions flash to vapor and can be made available to give up latent heat for vaporization of the liquid in the subsequent heat exchange chambers.

When the initial heating medium is an electrically heated coil, or combustion gases, or a nuclear fission or fusion reaction, or a liquid or vapor which is dissimilar to the liquid which is being evaporated, the condensate of the first heating chamber, if any, is not ordinarily admixed with the vapor portions issuing from the separator units.

Unlike the conventional evaporation apparatus, the heat exchange section and the liquid reservoir sections are dissociate, that is to say, they are engineered of individual component parts rather than made up of integral vessels. By separately constructing these component parts, each unit may be of relatively small size. Accordingly, because of their smaller size, these units may be made to accommodate higher pressures and yet not require wall thickness as great as would the more massive conventional evaporator effects consisting of an integral reservoir and heat exchange section.

Because reservoir and heat exchange are separate parts, it is possible to construct a single multi-sectional reservoir, each section of which functions as the reservoir for a different heat exchanger effect. In this way, I can provide a single compact reservoir unit which functions as the reservoir for a plurality of different heat exchange effects. Such a reservoir unit is preferably positioned so that its median depth is at the level of or higher than the top tube sheets of the heat exchangers. By so positioning the reservoir chamber, sufficient head of fluid is provided for establishing and maintaining a thermosiphon recycled pumping action through the heating chamber, even though no pump is physically provided. Thus, the preponderance of the liquid head supplied by the reservoir over the mixed phase column of vapor and liquid in and downstream of the heating chamber inherently governs the resultant pumping action.

Going into more detail, I refer to the accompanying drawings, in connection with which the following description of a preferred manner of carrying out the process and apparatus practices thereof is set forth, in which:

FIGURE 4 is a schematic flow sheet of the path of the condensate in accordance with a preferred embodiment of the invention.

FIGURE 6 shows an enlarged elevation of separator-reservoir unit in accordance with a preferred embodiment of my invention.

FIGURE 7 is a schematic fragmentary side elevation of a multiple effect evaporator whose heat exchangers and reservoirs are positioned in elevation to enhance gravity flow of feed from the more antecedent to the more subsequent effects.

FIGURE 8 is a schematic fragmentary side elevation of a quadruple effect evaporator in which any condensate from the heating chamber of the first effect is not admixed with condensate from subsequent effects to further augment heat exploitation.

Figure 1:
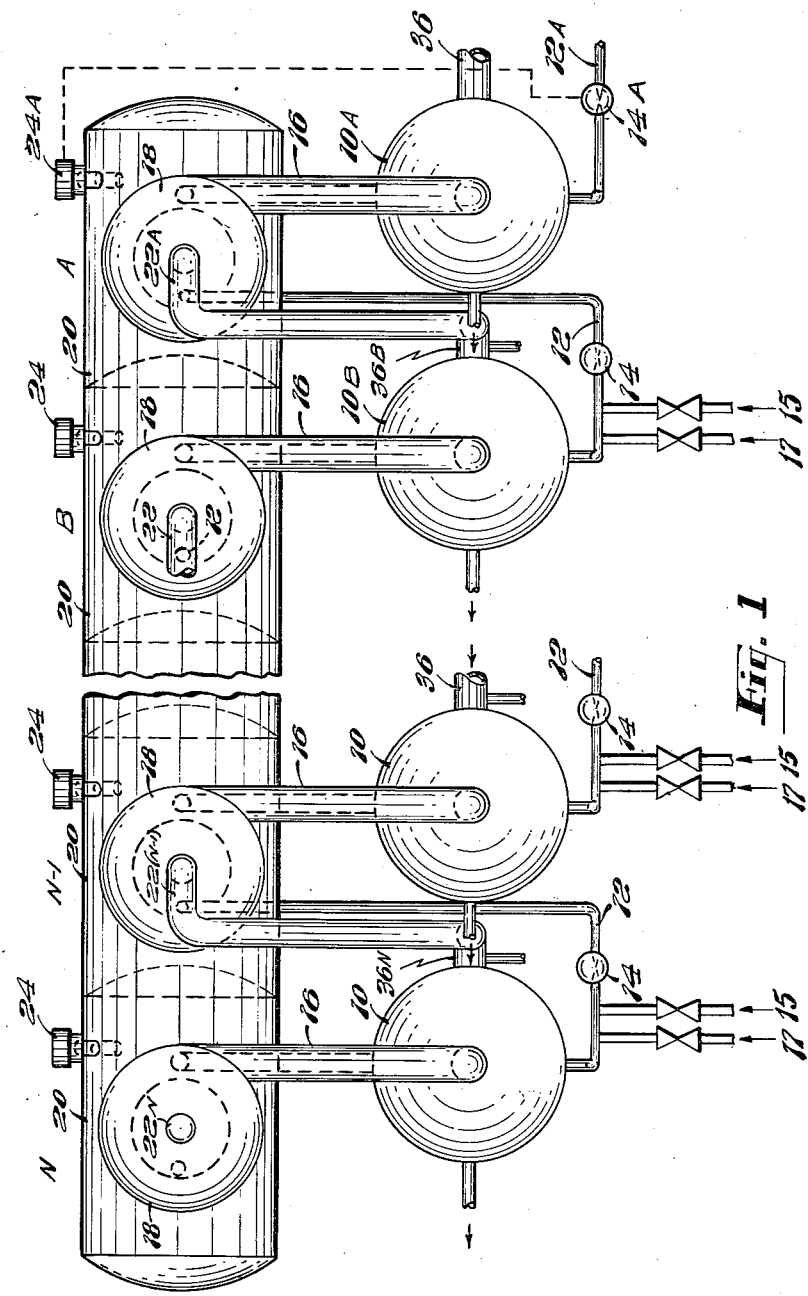
FIGURE 1 is a schematic fragmentary plan view of a multiple effect evaporator made in accordance with my invention.

FIGURE 8 also illustrates an embodiment of this invention which provides flexibility in carrying out the teaching of this invention under positive control.

Referring to the drawings, the evaporator of my invention consists of a series of individual effects, A, B, (N−1) and N, each of which includes a heat exchange chamber 10, an inlet line 12, a valve 14 on said inlet line, a line 16, for conveying the heated and vaporized products of the heat exchanger away from the exchanger, a separator chamber 18, which receives the products carried by line 16, a reservoir chamber 20 to receive the liquid fractions separated in separator 18, an opening 56 which releases vapors from the separator 18, and a level control 24 which is associated with and preferably attached to the reservoir chamber 20. Line 13 is designated on FIGURES 7 and 8 as the line through which concentrate is withdrawn from the system. As shown, an unobstructed recycle stream is provided for each effect through line 28 which connects the heat exchange unit 10 and the reservoir unit 20.

Also, each effect is provided with a means 36 for furnishing heat to the heat exchanger. For the first effect of the series, the heat may be furnished in the form of combustion gases, or an electrically heated coil, or a heating coil containing a medium such as dowtherm or the like, or a nuclear fission or fusion reaction, or solar heat, or the vaporized form of the same matter which is being evaporated. As is shown in FIGURE 8, when dissimilar heating media are employed, the media entering heat exchanger 10A are introduced through line 36A and vented from the system through line 38A. When the heating medium to the first effect is similar in chemical composition to the heating medium in subsequent effects, the heating medium is introduced to heat exchanger 10A through line 36A and may be vented therefrom through line 38A to trap 40A. By way of example, when water is being evaporated, steam under pressure may be used as the heating medium and some economy of operation can be realized by utilizing the heat of the condensate of the first effect by directing it into the heat exchange chamber of subsequent effects of the system.

In accordance with my preferred practice, the operating temperature and pressure of the first effect of the system is substantially higher than the operating temperature and pressure of subsequent effects in the system, and vacuum may be applied in conventional manner to the subsequent units of the system.

As shown in the drawings the various components of each effect of the evaporator, with the possible exception of the heating unit of the first effect, are substantially identical in each of the effects. Furthermore, the operation or functioning of each unit is identical with the operation or functioning of a similar unit of every other effect. Therefore, these units have been given the same numerical designation in the drawings although the units or elements of the first effect have been further designated A and the elements of the other units have been designated B, (N−1) and N respectively, where N represents the last effect of the series and (N−1) represents the next to last effect in the series. Also, the description of my invention as herein set forth has been limited to the operation and assembly of the units generally with specific mention of particular elements only where their function is a departure from the normal operation or assembly or is given by way of example. The number of effects which may be employed will of course vary and, in large measure, the physical characteristics of the liquid being evaporated and the initial heating medium will play a major part in determining the number of such effects. A convenient formula for determining the proper number of such effects is as follows:

$$N = \frac{T-t}{\Delta t}$$

where $N$ = the number of effects $T$ = the temperature of the heating medium to the first effect.

$t$ = the temperature of the concentrate in the final effect; and $\Delta t$ = the lowest allotted magnitude (that is to say, the magnitude of temperature difference which is arbitrarily determined at the time of designing the unit) of temperature difference between heating medium and fluid being evaporated in the individual effects.

The liquid to be evaporated enters the heating chamber 10A of the first effect through line 12A and valve 14A. Level control 24A, which is shown attached to the side of reservoir chamber 20, includes a level sensing mechanism (not shown) whereby it adjusts and measures the liquid level or liquid inventory of the effect as contained therein, and by means well known to the art, opens or closes valve 14A to let more or less liquid into the system. The desired liquid level of reservoir 20A has been predetermined and the level control 24A has been set to maintain this level in reservoir chamber 20A by the opening and closing control of valve 14A to control the amount of liquid introduced into the heat exchange chamber 10A. Of course, the liquid which is introduced to heat exchanger 10A may be preheated in other suitable heating equipment (not shown) before being introduced into line 12A.

Figure 2:
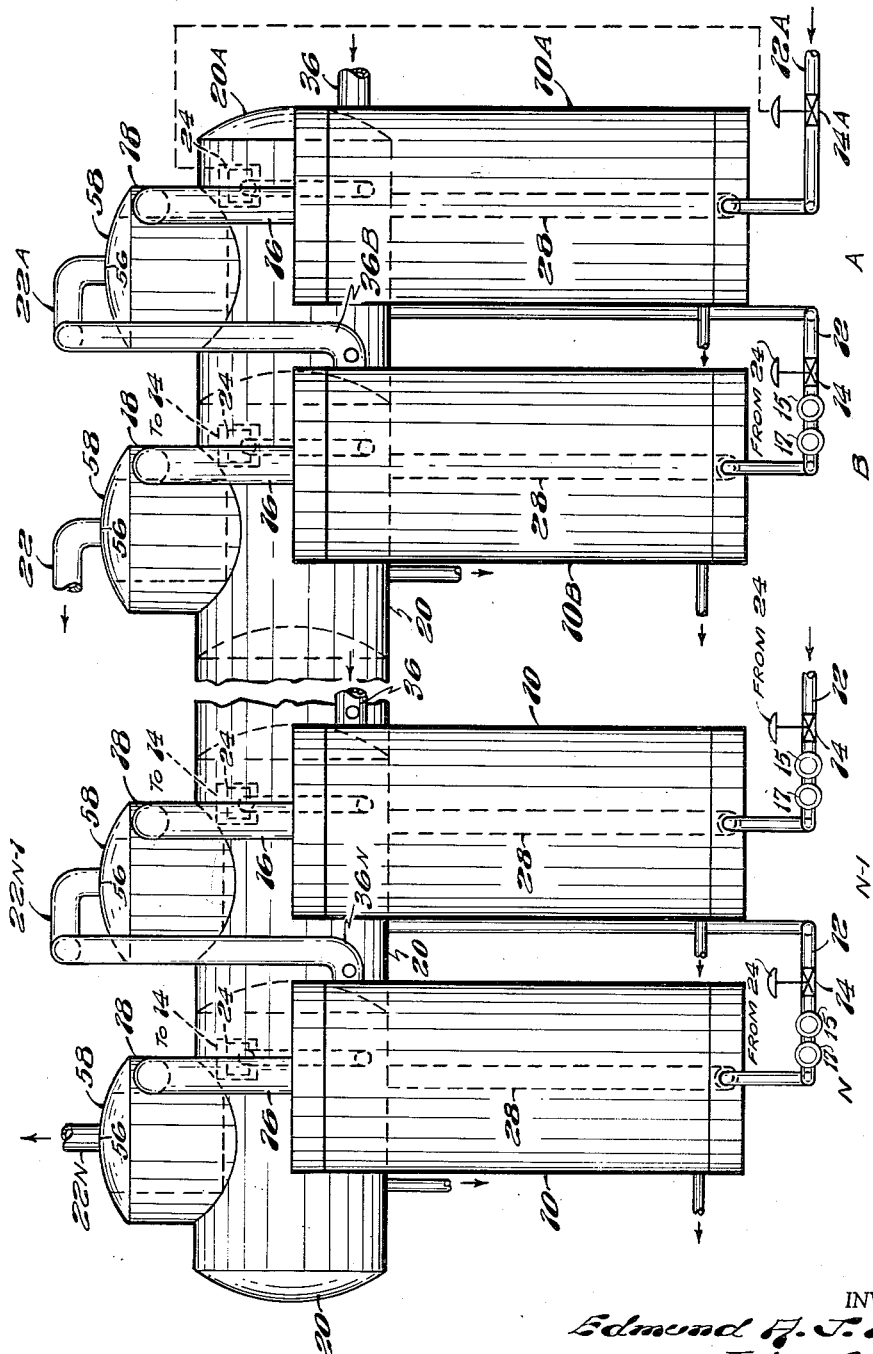
FIGURE 2 is a schematic front elevation of the apparatus shown in FIGURE 1.
Figure 3:
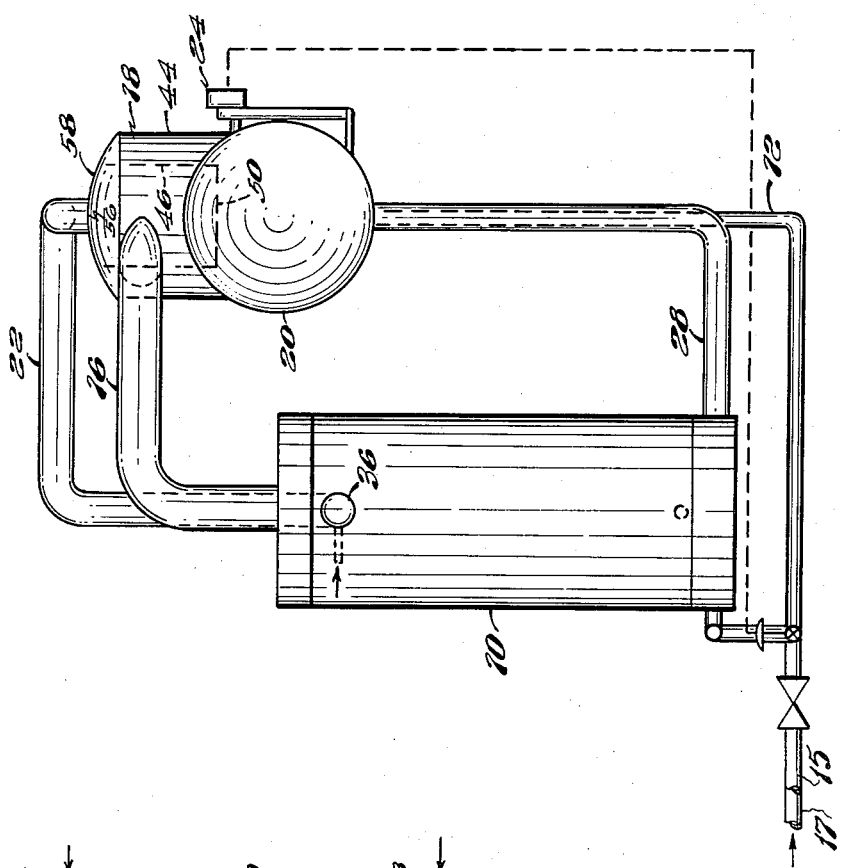
FIGURE 3 is a schematic side elevation of a single effect of the apparatus shown in FIGURE 1.
Figure 5:
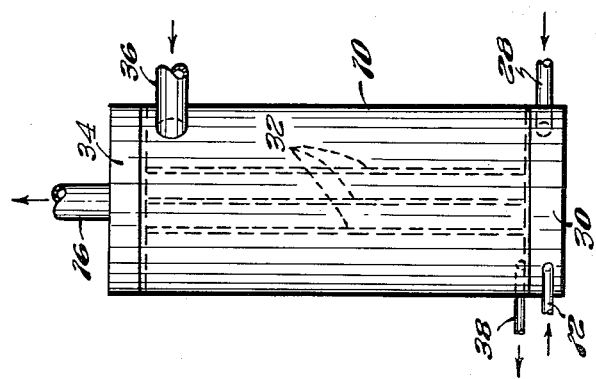
FIGURE 5 shows a fragmentary side elevation of a typical heat exchange chamber which may be employed as such in the practice of my invention.

As shown in FIGURE 5, the liquid passes into the heat exchanger through a distribution header or chamber 30 and passes up through tubes 32 into another header or chamber 34 and thence into line 16. The heating medium, which, as is shown herein, is steam at high pressure, enters the heat exchanger through line 36 and passes around the tubes 32. (Of course, it will be appreciated that other heating mediums may be used in place of steam as herein shown.) A tube 38 which communicates with the steam chamber provides for the escape of condensate (or otherwise cooled heating medium) from the heat exchanger through a steam trap 40. While I have shown in FIGURE 5 my preferred form of heat exchanger, it will be appreciated that other forms of heat exchangers can be used without departing from the teachings of my invention. For example, the heat exchanger 10, may provide for the steam to pass internally of the tubes 32, or in the case of the first such heat exchanger in the system, the heating medium may be some other form of heated fluid or may in fact be a flame, combustion gases, a heated electrical coil, or solar heat or a nuclear fission or fusion reaction. Referring to FIGURE 3, line 16 carries the liquids and vapors issuing from the heat exchanger chamber 10 into the liquid-gas separator 18. As shown, I prefer to use a cylindrical chamber 44, having an internal cylindrical baffle member 46 and introduce line 16 substantially tangential of the insides of the wall 44 of said chamber. The bottoms of the internal cylindrical baffle 46 and of the cylindrical chamber 44 open into reservoir chamber 20 and the liquids issuing through a line 16 thus pass into the separator 18 and into the reservoir chamber 20. The vapors (or steam) leave separator chamber 18, at decreased velocity through the opening 50, which is provided at the bottom of baffle 46, to leave the evaporator effect through opening 56 in the substantially domed upper wall 58, and are conveyed by line 22 into the steam line 36 of the next subsequent heat exchange unit. Thus, line 22A leads into line 36B and line 22 ($N-1$) leads into line 36N. If the vapor product of the evaporation is to be recovered as a liquid, the vapors leaving line 22N would be directed to a suitable condenser (not shown in FIGURES 1 and 2 but shown in FIGURE 7 as tubular condenser 25); if the product of evaporation is not to be recovered, line 22N would provide for suitable venting of said vapors.

As above mentioned, the condensate of the heat exchangers of the antecedent effects can be used to supply heat for the heat exchanger units of subsequent effects. In accordance with this embodiment, reference is made to FIGURE 4, which shows line 38A which leads from the heat exchange chamber 10A and conveys the condensate therefrom to steam trap 40A. Trap 40A provides for the escape of the liquid condensate from chamber 10A. Since the steam entering chamber 10A through line 36A is at high temperature and pressure, the liquid which is removed through trap 40A is substantially steam condensate at the same temperature and pressure. This liquid passes into a flash pot 60A which operates at the same lower absolute pressure as does the heating chamber 10B of the next subsequent heat exchanger. Accordingly, vapors of steam flash from the hotter liquid entering flash pot 60A and these are directed by line 62A into steam chamber 10B. Trap 41A, in turn, discharges flashed condensate through line 63A to condensate flash pot 60B. In a similar way, trap 40B receives condensate, and also delivers it to flash pot 60B, which operates at still lower absolute pressure and causes a portion of the condensate to flash and thereby furnish heat for the next subsequent effect. Likewise, the condensate of effect ($N-1$) can provide heat for effect N. Condensate is removed from the system through line 64 from condensate receiver 60N.

As explained above, the liquid and heat required for each effect of the system is furnished from the preceding effect for each effect but the first, and in the first effect the liquid and heat are supplied from an external source. As for the liquid, it passes from one effect to the next in accordance with demands of a level control 24 which is associated with the reservoir unit of the effect calling for the liquid. Also, it is my preferred practice to recycle liquid within each effect from reservoir 20 through the heat exchanger 10 through line 28. In this practice a measure of economy and safety is provided in that the heating surface is subjected to high fluid velocities, thus increasing coefficients of heat transfer, reducing deposition of solids and making immediately available a substantial reservoir of heat to accomplish instantaneous vaporization of a portion of the feed material. The size of the components for each effect may be the same or may vary depending on the physical characteristics of the liquid to be evaporated and the initial heating medium.

While it is my preferred practice to introduce all of the feed into the first effect of the system, it will of course be understood that I can introduce additional feed into heat exchangers subsequent to the first by pumping or otherwise supplying feed as through lines 15 and 17, downstream of valve 14 in line 12.

The following examples of the practice of my invention are set forth to further explain the principle of my invention as above described but should in no sense be taken to limit its scope. For this purpose, two relatively simple multiple effect evaporator systems were calculated and are tabulated below.

In each case sodium chloride solutions are concentrated to 25.0 weight percent sodium chloride, at identical final effect pressures of 26 inches of mercury vacuum, so as to avoid any complications that might be introduced through crystallization. Forward feed, at 3.5 weight percent sodium chloride is admitted with sufficient sensible heat to enter at the temperature prevailing in the respective first effect. A temperature differential of 20.8° F. between the liquids in adjacent effects and between the saturated heating steam and the liquid of the first effect was arbitrarily chosen. In the derivation of surface requirements, uniform reasonable coefficients for latent and sensible heat transfer were employed throughout. No allowance was made for any possible heat of dilution phenomena.

The first case serves to depict an evaporator system of my invention operating under conditions commonly used with evaporators in industry, heating steam to the first effect being provided at 240° F. (10 p.s.i.g.). The second case serves to demonstrate comparably, qualitatively and quantitatively, the consequences to be realized by just starting to develop the basic precepts of my invention.

*Case I.—Five Effect Evaporator*

| | Percent NaCl by Wt. | Steam Chest Pressure | Body Temp., °F. | B.P. Rise, °F. | Surface | Vaporization |
|---|---|---|---|---|---|---|
| Feed | 3.5 | | | | | |
| 1st Effect | 4.0 | 10 p.s.i.g. | 219.2 | 1.0 | 1.000 | 1.000 |
| 2nd Effect | 4.9 | 2 p.s.i.g. | 198.4 | 1.3 | 1.091 | 1.150 |
| 3rd Effect | 6.5 | 8 in.Hg Vac. | 177.6 | 1.7 | 1.325 | 1.298 |
| 4th Effect | 10.0 | 16 in. Hg Vac. | 156.8 | 2.6 | 1.610 | 1.441 |
| 5th Effect | 25.0 | 22 in. Hg Vac. | 136.0 | 10.0 | 2.29 | 1.575 |

*Case II.—Nine Effect Evaporator*

| | Percent NaCl by Wt. | Steam Chest Pressure | Body Temp., °F. | B.P. Rise, °F. | Surface | Vaporization |
|---|---|---|---|---|---|---|
| Feed | 3.5 | | | | | |
| 1st Effect | 3.6 | 79 p.s.i.g. | 302.4 | 1.2 | 0.1107 | 0.1165 |
| 2nd Effect | 3.7 | 53.5 p.s.i.g. | 281.6 | 1.2 | 0.1271 | 0.281 |
| 3rd Effect | 3.9 | 34.8 p.s.i.g. | 260.8 | 1.2 | 0.300 | 0.438 |
| 4th Effect | 4.3 | 20.5 p.s.i.g. | 240.0 | 1.2 | 0.476 | 0.586 |
| 5th Effect | 4.9 | 9.7 p.s.i.g. | 219.2 | 1.3 | 0.653 | 0.734 |
| 6th Effect | 5.9 | 1.8 p.s.i.g. | 198.4 | 1.6 | 0.845 | 0.876 |
| 7th Effect | 7.6 | 8 in. Hg Vac. | 177.6 | 2.1 | 1.060 | 1.013 |
| 8th Effect | 11.3 | 16 in. Hg Vac. | 156.8 | 3.1 | 1.321 | 1.148 |
| 9th Effect | 25.0 | 22 in. Hg Vac. | 136.0 | 10.0 | 1.868 | 1.275 |

The results tabulated above fulfill the material and energy balances that will prevail only for the conditions for which the calculations were made. As is inherently true of multiple effect evaporators in general, any change in operating conditions will result also in an evaporator system of this invention spontaneously adjusting itself to the new conditions. This it will do, as if a mechanical brain were to be fed the data, immediately reconcile the discrepancies introduced, perform the trial-and-error computations necessary to achieve requisite material and energy balances, transmit its findings at once to each individual component of the evaporator and, finally, to stabilize operation at the new conditions of temperature, concentration and pressure governed by all the many parameters involved.

Particularly of significance in illustrating the principles of my invention are the following results immediately apparent in the tabulation:

(1) The lower heating surface requirements in the earlier evaporator effects.

It may also be seen in FIGURE 8 that it is possible to direct steam at higher pressure to provide heating medium to effects more remote than the next subsequent effect. As is shown in FIGURE 8, line 22A may be used to by-pass a portion of the steam of line 22A around effect B into the steam chest of heat exchanger 10C, and line 222A is shown to be capable of by-passing a portion of the steam from line 22A around effects B and C into the steam chest of heat exchanger 10D. Lines 122B and 222B provide means for diverting steam from line 22B to other sources. Lines 122B and 222B also provide means for supplementing steam from external sources to subsequent effects of the system.

In the embodiment shown in FIGURE 8, it is also possible to direct concentrate from an earlier effect to an effect more remote than the next subsequent effect without departing from the teaching of this invention. As there shown, line 112B by-passes concentrate from line 12B around effect B to provide through valve 15C part of the feed for effect C, and line 212B by-passes concentrate from line 12B around effects B and C to provide through valve 15D part of the feed for effect D. Lines 112C and 212C are shown to represent the suitable withdrawal of concentrate to other destinations or the suitable supplementation of feed from external sources.

(2) The gradual "snow-balling" of vaporization in succeeding effects.

Because the earlier effects of the evaporator systems operate at higher pressures, reduced requirements for heating surface result in reduced diameters of tube bundles and of vapor piping and, therefore, in greater economy in construction. This significance becomes compounded when, in the interests of operating economy, yet higher initial operating pressures are employed in evaporators using substantially greater numbers of effects at the reduced temperature and pressure differentials across each effect made practicable by this invention.

The amount of vaporization within each effect is shown to increase from effect to effect, despite increasing latent heats at the progressively decreasing operating temperatures and pressures of these "forward feed" examples. The increasing latent heats are more than offset by the combined effect of feed and condensate flash. Thus, each succeeding effect enjoys the advantage of increased heat input to itself and it, in turn, augments heat input to its own succeeding effect.

The higher level of sensible heat input to the feed of the second example is more than compensated for by a substantially reduced latent heat input requirement. As the total number of effects may be further increased, moreover, through the reduced temperature and pressure differentials made feasible by my invention, the latent and sensible heat recuperable in heat exchange to the feed from the condenser and concentrate and condensate product streams can lead to an extremely high degree of operating economy.

Other than the "forward feed" procedure discussed and illustrated above, an evaporator system of this invention is readily modified, with the addition of the necessary accessories, to accept methods of feeding that might be required to achieve any desired result.

As an illustration of the foregoing, in FIGURE 8 valve 114 can fulfill the function normally assigned to valve 14D of governing inflow of feed to effect D through the influence of control 24D. Feed is admitted in such a case from a source external to the evaporator proper through line 17D and valve 114 to maintain the level in reservoir 20D, while valve 14D of FIGURE 8 by its setting exerts a demand upon control 24C which is shown satisfied in the customary manner through valve 14C.

It will be recognized by those skilled in the art, that in some of its applications, the apparatus of my invention will be most efficiently exploited when multiple modules are arranged in cascade so that the most antecedent is at the highest vertical elevation and the most subsequent is at the lowest vertical elevation. This is shown in FIGURES 7 and 8. Also, a plurality of modules may be combined at a given elevation and function in combination with other combinations of modules positioned at other elevations.

The straightforward principles of evaporator theory and practice inherent in the separate thermosiphon heaters, the compact vapor-liquid disengagement means, the inventory level controls, all combined into modules capable of being almost infinitely cascaded, the exploitation for the sake of economy of an ultimate degree of heat utilization, the relative absence of moving parts (in such a preferred embodiment as described herein), and the simple means of control, by adjusting only the rate of concentrate withdrawal, all combine to achieve economy in materials of construction, of space requirements, of investment, of supervision and of production.

I claim:

1. Apparatus for utilizing thermosiphon recirculation in conducting evaporation consisting of a plurality of individual evaporation stage units each of which comprises in combination an individual heat exchanger, means associated with each heat exchanger for introducing heating medium into said heat exchanger, means associated with each heat exchanger for discharging said heat exchanger of the material heated therein, a liquid-vapor separating chamber provided for, associated with and disposed externally of each heat exchanger, said separating chamber being connected to the aforementioned means for discharging, a reservoir means disposed externally of the heat exchanger but associated therewith and communicating with the liquid-vapor separating chamber, means for conveying vapors from antecedent liquid-vapor separating chambers to the means for introducing heating medium of subsequent heat exchangers; unobstructed means for recycling liquid from the reservoir means to the heat exchanger; liquid level control means associated with each reservoir means, level sensing means associated with each liquid level control means of each said reservoir means; a feed liquid inlet line for each heat exchanger; a valve in said liquid inlet line, said valve opening and closing directly responsive to demands made upon it by changing liquid level within the reservoir means of the same heat exchanger and indirectly responsive to changing liquid level within the reservoir means in subsequent stage units, stage by stage, said valve opening when the level sensing means denotes a deficiency of liquid level and closing when it denotes a sufficiency of liquid level, said changes being measured by the level sensing means situated in said associated but externally disposed reservoir means; a line leading from the liquid inlet line and valve therein to the reservoir means of an antecedent heat exchanger for all but the first such heat exchanger; means for venting the vapors from the most subsequent liquid-vapor separating chamber, means for discharging the condensate from the heat exchangers, and means for discharging liquid from the most subsequent reservoir means.

2. The apparatus of claim 1 where the means for introducing a heating medium comprises means for utilizing the vapor from the heat-depleted heating medium of an antecedent heat exchanger to provide part of the heat for the subsequent heat exchanger.

3. Apparatus for employing thermosiphon recirculation in conducting evaporation of a liquid which comprises in combination a plurality of heat exchangers in series, means associated with each heat exchanger for introducing heating medium into said heat exchangers; a liquid-vapor separating chamber provided for each of said heat exchangers and being associated therewith and externally disposed thereof; means communicating between each heat exchanger and its respective and associated liquid-vapor separating chamber for allowing all of the effluent of said heat exchanger to pass to its respective liquid-vapor separating chamber, reservoir means associated with each liquid-vapor separating chamber and its associated heat exchanger which is also disposed externally of the said heat exchanger, means for the communication of the liquid effluent from the liquid-vapor separating chamber to the said associated reservoir means, unobstructed means for recycling liquid fractions from the reservoir means to its associated and respective heat exchanger, liquid level control means associated with each reservoir means, liquid level sensing means associated with each liquid level control means of each said reservoir means, an inlet line for each of said heat exchangers for introducing into said heat exchanger liquid to be evaporated, a valve in said inlet line opening and closing responsive to the changes of liquid level as demanded by the liquid level sensing means of said associated reservoir means, said valve opening when the level sensing means denotes a deficiency of liquid level and closing when it denotes a sufficiency of liquid level, a line leading to said inlet line from the reservoir means of a given antecedent heat exchanger where in the system there is such and from the source of liquid to be evaporated when there is no antecedent heat exchanger; means for discharging vapor from the liquid-vapor separating chamber and for introducing said vapor to the means for introducing heating medium into a subsequent heat exchanger, means for venting vapors from the most subsequent liquid-vapor separating chamber, means for discharging heat-depleted heating medium from the heat exchangers and means for discharging liquid from the most subsequent reservoir means.

4. The apparatus of claim 3 in which the more antecedent heat exchangers and associated reservoir means are positioned at higher elevation than the more subsequent heat exchangers and reservoir means whereby to enhance gravity flow of feed from the more antecedent to the more subsequent components of the system.

5. Apparatus for employing thermosiphon recirculation in conducting evaporation comprising in combination a plurality of individual heat exchangers in series relationship, means for introducing liquid into said heat exchangers, means for introducing heating medium into each of said exchangers, means within each heat exchanger for flowing the heating medium in heat exchange relationship with the liquid to be evaporated, means for venting said heat exchanger of the products heated therein, a separate unit for each heat exchanger in the series comprising a liquid-vapor separating chamber which connects to the heat exchanger venting means and receives and separates the liquids and vapors issuing therefrom, means for venting the vapors from said liquid-vapor separating chamber; means for conveying said vented vapors from the liquid-vapor separating chamber of an antecedent heat exchanger to the means for introducing heating medium of a subsequent heat exchanger, individual reservoir means for each heat exchanger disposed externally thereto for receiving liquid fractions from the liquid-vapor separating chamber, means communicating between said reservoir means and the liquid-vapor separating chamber, unobstructed means communicating between said reservoir means and said heat exchanger for recycling liquid fractions of the reservoir means to the heat exchanger, liquid level control means associated with each reservoir, liquid level sensing means associated with each liquid level control means of each said reservoir means, signalling means in said liquid level sensing means which is responsive to changes of liquid level within said reservoir means, a liquid inlet line for each of said heat exchangers, a control valve in said liquid inlet line, said control valve opening and closing responsive to changes of liquid level within said reservoir means, said control valve opening when a deficiency of liquid level within said reservoir means and closing when a sufficiency of liquid level in said reservoir means is signalled by said signalling means, means for feeding liquid to said liquid inlet line from the reservoir means of an antecedent heat exchanger, means for discharging heat-depleted heating medium from the heat exchangers and means for discharging liquid from the most subsequent reservoir means.

6. The apparatus of claim 5 which is further modified by having means for conveying the heat-depleted heating medium from the heating means of antecedent heat exchangers in the series and further means for introducing vapors of said heat-depleted heating medium as heating medium of subsequent heat exchangers in the series.

7. The apparatus of claim 5 in which subsequent heat exchangers are provided with means for receiving feed liquid in addition to and to supplement the feed liquid provided by antecedent reservoir means.

8. Apparatus for employing thermosiphon recirculation in conducting evaporation of liquid which comprises in combination a plurality of heat exchangers in series relationship, means for introducing into the first of said heat exchangers heating medium other than vapors released from the liquid being treated and means within said first heat exchanger for flowing liquid to be vaporized in heat exchange relationship with said heating medium, means for discharging the heat-depleted heating medium from said first heat exchanger, means for introducing another heating medium comprising vapors of liquid being evaporated into the heat exchangers of the series subsequent to the first, and means in said subsequent heat exchangers for flowing liquid to be vaporized in heat exchange relationship with the heating medium therein, means for discharging the liquid-vapor effluent from heat exchangers, means for separating the liquid portion from the vapor portion of said effluent, separate reservoir means associated with but disposed externally of each heat exchanger, means for directing the vapor portion of the effluent of antecedent separating means into heat exchange relationship with the liquid in subsequent heat exchangers wherein said vapor portion provides the heating medium, pressure reducing means associated with the most subsequent heat exchanger, means for recovering the heat-depleted heating medium of the heat exchangers subsequent to the first, respective means associated with all heat exchangers except for the most subsequent heat exchanger for separating vapor from said heat-depleted heating medium, means for directing said last-mentioned vapor in heat exchange relationship with liquid in subsequent heat exchangers, means communicating between reservoir means and liquid-vapor separating means, unobstructed means communicating between said reservoir means and the heat exchanger associated with said reservoir means for recycling liquid fractions from the reservoir means to the heat exchanger, level sensing means associated with each of said reservoir means, signalling means in said level sensing means which is responsive to changes of liquid level within said reservoir means, a liquid inlet line for each of said heat exchangers, a control valve in said liquid inlet line opening and closing responsive to the signals received from said signalling means, said control valve opening when said signalling means denotes a deficiency in liquid level and closing when said signalling means denotes a sufficiency in liquid level, means for feeding liquid to said liquid inlet line from the reservoir means of an antecedent heat exchanger, means for discharging heat-depleted heating medium from the heat exchangers and means for discharging liquid from the most subsequent reservoir means.

9. The apparatus of claim 8 in which subsequent heat exchangers are provided with means for receiving feed liquid in addition to and to supplement the feed liquid provided by antecedent reservoir means.

10. A continuous process for employing thermosiphon recirculation in evaporating liquid in a multiple stage system, which comprises flowing said liquid in heat exchange relationship with a heating medium in a first stage, removing the heat-depleted heating medium, recovering the heated products of said first stage heat exchange externally thereof, separating the vapor portions of said recovered products from the liquid portions thereof, recycling a portion of said recovered liquid portions to said first stage heat exchange, flowing separately the vapors of said recovered products and also separately flowing the remainder of the recovered liquid portion into a second stage heat exchange, recovering the products of said second stage heat exchange externally thereof and separating the vapor portions from the liquid portions, controlling the amount of liquid products passing from the recovered products of the first stage heat exchange into heat exchange relationship in the second stage by increasing the flow of recovered liquid products from the first stage to compensate for a deficiency of liquid in the second stage and by decreasing the flow of recovered liquid products from the first stage to prevent an excess of liquid in the second stage, venting the vapors from the recovered products of the second stage, removing the heat-depleted heating medium from said second stage and withdrawing liquid from said second stage.

11. A continuous process for employing thermosiphon recirculation in evaporating liquid comprising the steps of conducting a plurality of heat exchanges in a series, introducing all of the heating medium and all of the liquid to be evaporated into the first of said heat exchanges and recovering all of the heated liquid products and vapor products of said heat exchange externally of said heat exchange, directing the vapor products into the next subsequent heat exchange wherein said vapor products provide the heating medium, recycling a portion of said recovered liquid products to the said first heat exchange, separately directing at least a portion of the said liquid products to the second heat exchange, providing in kind for the aforementioned liquid and the aforementioned heating medium for each heat exchange to be furnished from the next preceding heat exchange of the series except for the first heat exchange of the series, providing for the recovery of the heated products of each heat exchange externally of the corresponding heat exchange, recycling a portion of the liquid products of each heat exchange to said heat exchange, controlling the amount of liquid product flowing from a preceding to a subsequent heat exchange by increasing the flow of said liquid product to compensate for a deficiency of liquid in said subsequent heat exchange and by decreasing the flow of said liquid product to prevent an excess of liquid in said subsequent heat exchange, operating each heat exchange of the series progressively at lower operating temperature and pressure, removing the heat-depleted heating medium from each of said heat exchanges, venting the vapors from the most subsequent heat exchange and controllably withdrawing liquid from said most subsequent heat exchange.

12. The process of claim 11 in which vapor from the heat-depleted heating medium of antecedent heat exchanges is introduced as a portion of the heating medium in subsequent heat exchanges.

13. A continuous process for employing thermosiphon recirculation in evaporating liquid which comprises conducting multiple heat exchanges in series, collecting and measuring the amount of liquid products of said heat exchanges separately and externally of each said heat exchange and sensing the level thereof as collected, directing the vaporous products of antecedent heat exchanges into subsequent heat exchanges as heating medium, separating and directing at least some of the liquid products of an antecedent heat exchange as feed to a subsequent heat exchange and recycling the remaining portion of said liquid products of said antecedent heat exchange within said antecedent heat exchange, adjusting the rate of flow of liquid from antecedent heat exchanges to subsequent heat exchanges as feed therefor by regulating the volume of liquid passing from that which is collected from antecedent heat exchanges in accordance with the demand of subsequent heat exchanges as measured in the collected liquid products of subsequent heat exchanges, said rate of flow of liquid into a given heat exchange being increased when a deficiency in the level of the collected liquid products of the heat exchange directly being fed is sensed and decreased when a sufficiency in the level of the collected liquid products of the heat exchange directly being fed is sensed, removing the heat-depleted heating medium from each heat exchange, venting the vapors of the system through the most subsequent heat exchange and controllably withdrawing liquid from the most subsequent heat exchange.

14. The process of claim 13 in which the initial heat exchange is conducted at pressures higher than atmospheric pressure.

15. The process of claim 13 in which the heat exchange is accomplished in the subsequent heat exchanges under vacuum.

References Cited in the file of this patent

UNITED STATES PATENTS

| | | | |
|---|---|---|---|
| 378,843 | Lillie | Feb. 28, | 1888 |
| 1,009,782 | Ordway | Nov. 28, | 1911 |
| 1,143,744 | Bauer | June 22, | 1915 |
| 1,944,548 | Ebner | Jan. 23, | 1934 |
| 2,012,668 | Jahn | Aug. 27, | 1935 |
| 2,181,731 | Hinckley | Nov. 28, | 1939 |
| 2,262,519 | Talton | Nov. 11, | 1941 |
| 2,734,565 | Lockman | Feb. 14, | 1956 |
| 2,746,536 | Sumiyu | May 22, | 1956 |
| 2,750,999 | De Vries | June 19, | 1956 |
| 2,796,120 | Lockman et al. | June 18, | 1957 |
| 2,896,705 | Ramen | July 28, | 1959 |
| 2,941,590 | Rosenblad | June 21, | 1960 |

FOREIGN PATENTS

| | | | |
|---|---|---|---|
| 548,363 | Germany | Apr. 19, | 1932 |
| 1,044,805 | France | Nov. 20, | 1953 |
| 1,101,811 | France | Oct. 11, | 1955 |

UNITED STATES PATENT OFFICE
CERTIFICATE OF CORRECTION

Patent No. 3,122,487            February 25, 1964

Edmund A. J. Mroz

It is hereby certified that error appears in the above numbered patent requiring correction and that the said Letters Patent should read as corrected below.

Column 7, line 62, beginning with "It may also be seen" strike out all to and including "from external sources.", in column 8, line 11, and insert the same after line 55, of column 8.

Signed and sealed this 30th day of June 1964.

(SEAL)
Attest:

ERNEST W. SWIDER             EDWARD J. BRENNER
Attesting Officer            Commissioner of Patents